Figure 7:
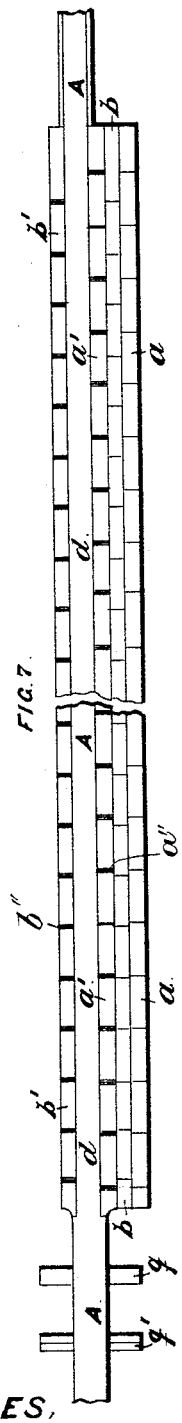

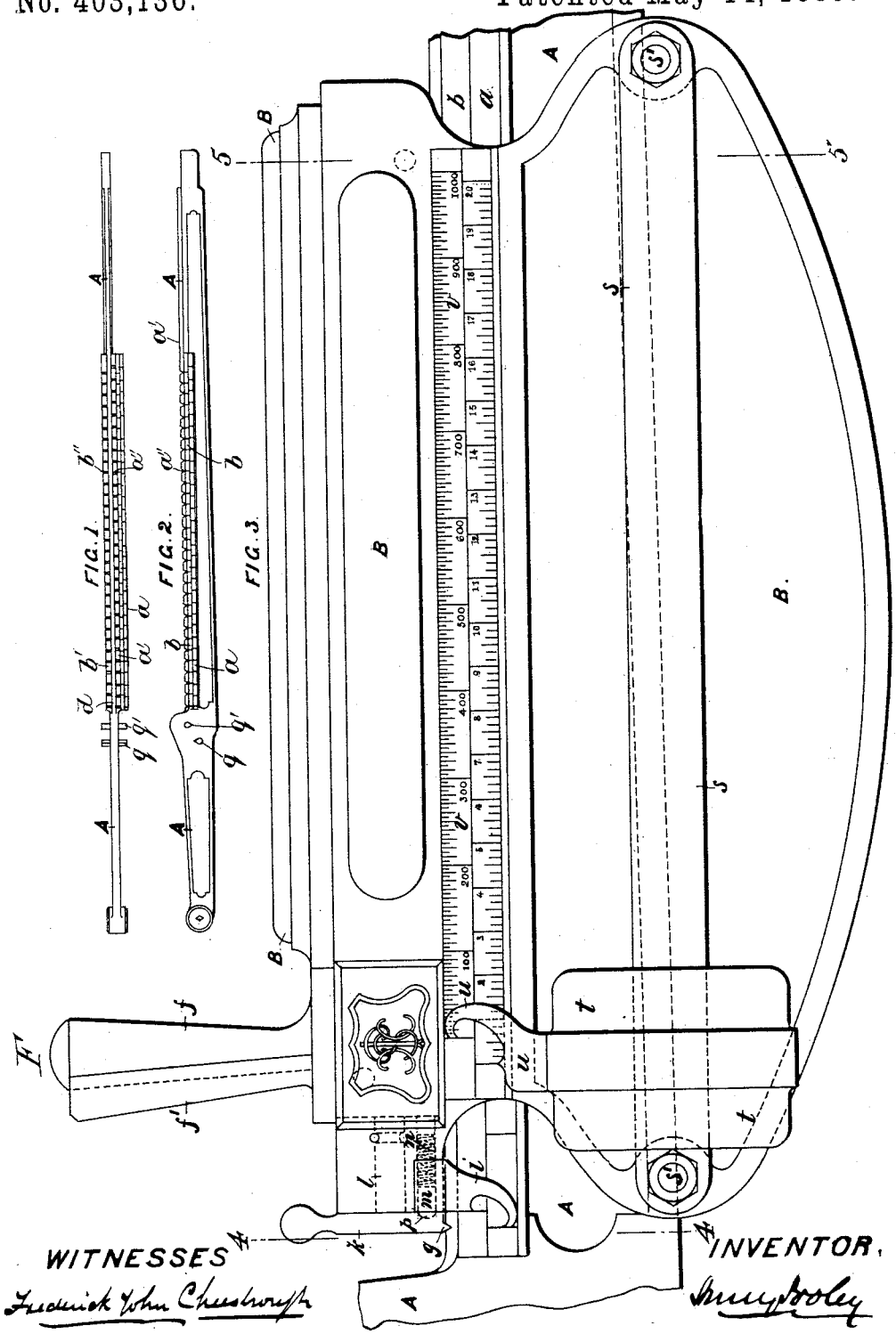

(No Model.) 5 Sheets—Sheet 2.
H. POOLEY.
STEELYARD FOR WEIGHING MACHINES.
No. 403,136. Patented May 14, 1889.
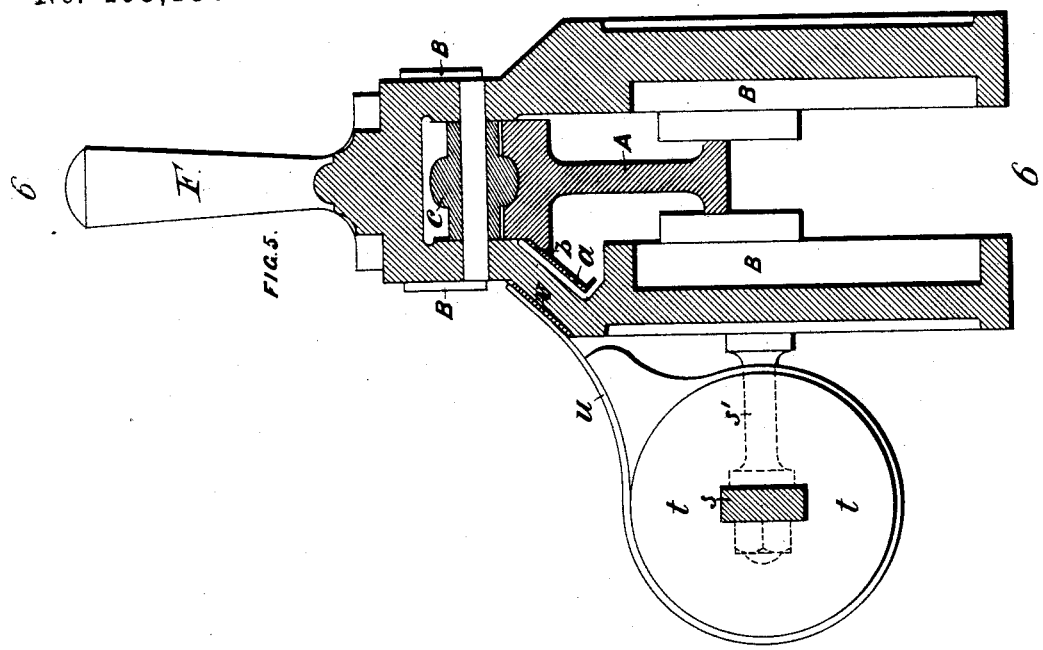
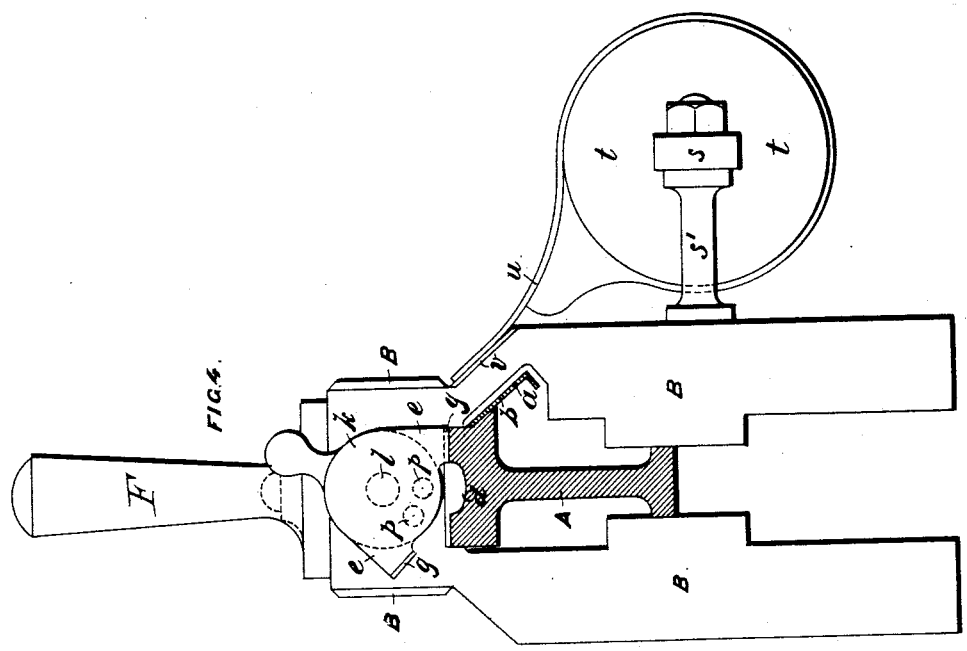
WITNESSES
Frederick John Cheesbrough
James Andrew Coubrough.
INVENTOR,
Henry Pooley

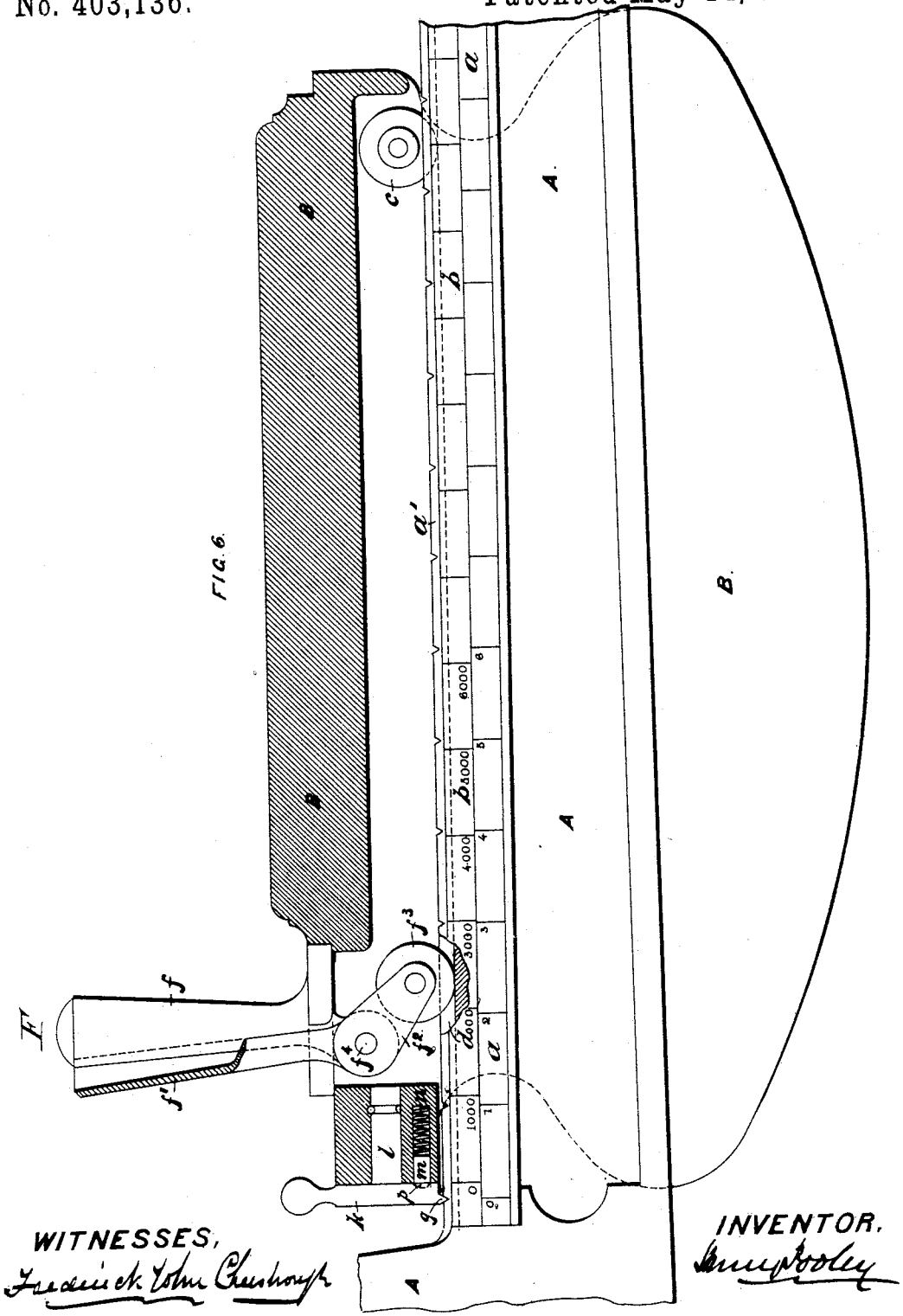

(No Model.) 5 Sheets—Sheet 4.

H. POOLEY.
STEELYARD FOR WEIGHING MACHINES.

No. 403,136. Patented May 14, 1889.

WITNESSES,
Frederick John Cheesbrough
James Andrew Coubrough

INVENTOR
Henry Pooley (No Model.) 5 Sheets—Sheet 5.
H. POOLEY.
STEELYARD FOR WEIGHING MACHINES.
No. 403,136. Patented May 14, 1889.
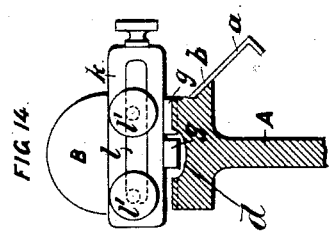
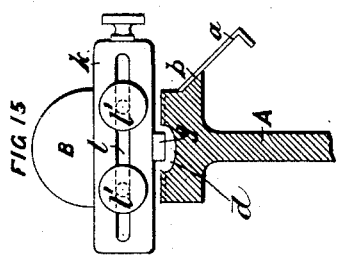
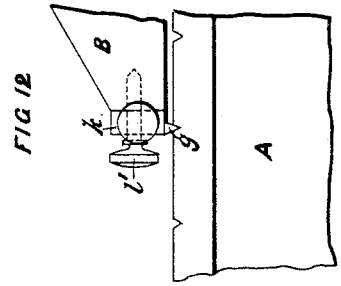
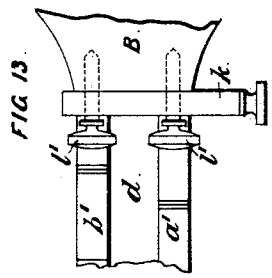
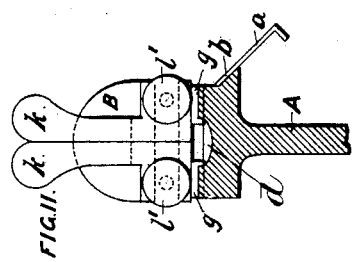
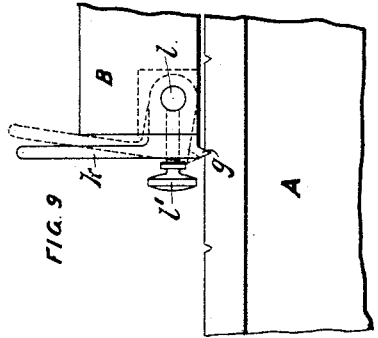
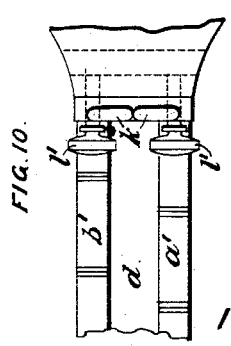
WITNESSES. INVENTOR.

UNITED STATES PATENT OFFICE.

HENRY POOLEY, OF LIVERPOOL, COUNTY OF LANCASTER, ENGLAND.

STEELYARD FOR WEIGHING-MACHINES.

SPECIFICATION forming part of Letters Patent No. 403,136, dated May 14, 1889.

Application filed June 4, 1886. Serial No. 204,107. (No model.) Patented in England November 10, 1885, No. 13,642; in France May 8, 1886, No. 176,006; in Belgium May 10, 1886, No. 73,051; in Norway May 26, 1886, No. 74; in Sweden May 26, 1886, No. 744; in Germany June 5, 1886, No. 38,447; in Canada June 14, 1886, No. 24,282, and in Spain September 1, 1886, No. 9,345.

*To all whom it may concern:*

Be it known that I, HENRY POOLEY, engineer, a subject of the Queen of Great Britain, and a resident of the city of Liverpool, in the county of Lancaster, in that part of the United Kingdom of Great Britain and Ireland called England, have invented Improvements in Steelyards for Weighing-Machines, (for which Letters Patent have been granted to me in Belgium, No. 73,051, dated May 10, 1886; in France, No. 176,006, dated May 8, 1886; in Spain No. 9,345, dated September 1, 1886; in Norway, No. 74, dated May 26, 1886; in Germany, No. 38,447, dated June 5, 1886;
in Sweden, No. 744, dated May 26, 1886; in Great Britain, No. 13,642, dated November 10, 1885, and in Canada, No. 24,282, dated June 14, 1886;) and the following is a description of my invention in such full, clear, and exact terms as to enable any one skilled in the art to which it appertains to make and use the same, reference being had to the accompanying drawing, making a part of this specification, the drawings being marked with letters and figures of reference, and like letters and figures on the drawings being used to denote like parts throughout the various views.

This invention relates to that class of steelyards of weighing-machines which are employed in connection with weigh-bridge, platform, and other like weighing-machines; and has for its object to provide, in connection with such weighing-machines, means whereby two or more different standards of weight or codes or values may be presented, and which may be capable of being determined or indicated by one steelyard-bar and without the intervention of a revolving index-bar.

According to my invention there are provided, in connection with the steelyard of a weighing-machine, two or more graduated indexing scale-plates, whose divisions being suitably pitched, two or more different standards of weight or codes or values are presented, and which are capable of being determined or indicated by one steelyard-bar and without the intervention of a revolving index-bar. The steelyard is provided upon its upper surface with two or more parallel graduated, notched, or engaging scales, which correspond with the graduated indexing scale-plates, hereinafter described, and which are provided with means whereby an engaging device working upon a sliding counterpoise can engage with any one of the engaging-scales as may be required. This device I preferably construct in the form of an alternating piece having V-edges, which fit into the grooves or notches of the engaging-scales, and which are formed on parallel graduated bars on the face of the steelyard.

The graduated index scale-plates are preferably placed on the upper part of one of the sides of the steelyard and are inclined upward, so as to be more readily and easily seen and read. These scale-plates are upon the long arm of the steelyard, and are graduated with the desired number of scales placed or cut one above the other, and which form the major units-scales, such as tons avoirdupois and thousand kilograms metric weight or other weights. The index-scales are pitched upon the scale-plates, so as not to start in line vertically, thereby facilitating the readings and avoiding confusion.

A pointer having two or more indicating points or elements is attached to the index end of the counterpoise. The indicating points or elements of this pointer are stepped one behind the other to correspond with the differently-pitched scales upon the scale-plates and the notched graduated bars on the surface of the steelyard.

The aliquot parts of the major division of weight are determined by means of a bar on which a pointer slides, and which is attached to and at the side of the counterpoise, and index-scale plates which are also attached to the counterpoise. The index-scales of minor divisions of weights are inclined and graduated in substantially the same manner as the index-scales of major weights, and the pointer is also constructed substantially in the same manner as that previously mentioned, as will hereinafter be seen.

Figure 8:
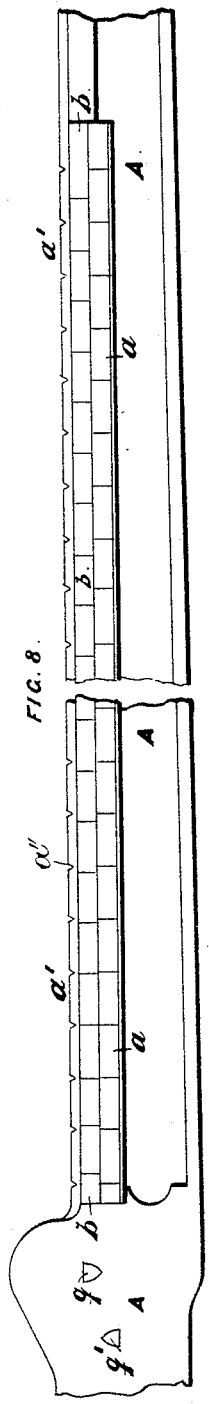

In the drawings, Figure 1 is a plan view, and Fig. 2 is a front elevation, of a steelyard or weigh-bridge beam in its preferred form. Fig. 3 is a front elevation showing a portion of the steelyard and the movable sliding counterpoise with the major and minor indexing scale-plates in their preferred position on the steelyard and counterpoise. Fig. 4 is a cross-section taken at 4 4, Fig. 3. Fig. 5 is a cross-section taken at 5 5, Fig. 3. Fig. 6 is a longitudinal section taken at 6 6, Fig. 4. Fig. 7 is an enlarged view of the graduated portion shown in Fig. 1. Fig. 8 is a side elevation of a device shown in Fig. 7. Fig. 9 is a side elevation, Fig. 10 is a plan view, and Fig. 11 is an end view, of a lever device for switching the knife-edge or V of the counterpoise. Fig. 12 is a side elevation, Fig. 13 is a plan, and Fig. 14 is an end view, of a slide device for switching the knife-edge or V of the counterpoise. Fig. 15 shows a modification of the slide shown at Figs. 12, 13, and 14.

In reference to the figures, A designates a steelyard or beam having two indexing scale-plates, $a$ and $b$.

$q\ q'$ are the ordinary knife-edges. The divisions of these scale-plates represent different standards—namely, the scale-plate $a$ may be taken to represent tons and the scale-plate $b$ kilograms. It will be seen that the commencements of the scales upon the plates $a$ and $b$ are pitched one behind the other and not in line vertically, thereby facilitating the readings and avoiding confusion. These graduated indexing scale-plates $a$ and $b$ are ranged upon the upper edge of the steelyard-bar A, and the sliding counterpoise B, which slides on the steelyard A, is capable of being engaged at its indexing end with the notches or divisions $a''$ and $b''$ on the notched bars $a'\ b'$, which notches are cut on the upper face of the steelyard and which correspond with the divisions of the scale-plates $a$ and $b$.

To facilitate the reading of weight, I attach the indexing scale-plates $a$ and $b$ to the side of the steelyard A, (these scale-plates are separable from and attached to the beam A,) which is beveled, as shown at Figs. 4 and 5, so that the scales are turned up to the view of the weigher. These scale-plates $a$ and $b$ display clearly the scales, and correspond, as before mentioned, with the deeply-cut graduations $a''\ b''$ on the steelyard. The movable sliding counterpoise B is, by preference, made of saddle form, one side being cut out to clear the indexing scale-plates. One end of the counterpoise B is provided with a roller, $c$, which takes into a longitudinal groove, $d$, formed upon the upper edge of the long arm of the steelyard A, and the other or indexing end of the counterpoise B is provided with a tumbler, $k$, having projections $e$, with knife-edges or V's $g$, the function of which is hereinafter described. A vertical handle, F, is securely attached to the index end of the counterpoise B. This handle F is made in two portions. One portion, the stock-handle $f$, is fixed to the counterpoise B, and the other portion, the shell-handle $f'$, is a lever whose short arm $f^2$ is cranked and furnished with a roller, $f^3$, the joint or fulcrum $f^4$ being below the base of the stock-handle $f$. When the handle F is grasped by the hand of the weigher for the purpose of moving the counterpoise B, the short or roller end $f^2$ of the shell-handle $f'$ is pressed against the edge of the steelyard A, so that the roller $f^3$ raises the knife-edge or V $g$ of the counterpoise B out of the notch on the steelyard A with which it has been engaged, thus freeing the V $g$ and counterpoise B to take a new position on the graduated or notched scale of the steelyard A, upon which it slides freely by means of the rollers $c$ and $f^3$, described above. Upon the weigher relaxing his grasp from the handle F, the counterpoise is lowered and its V $g$ falls into and engages with the notched division next below it.

To avoid the possibility of confusion in the readings of weight as given by either of the scale-plates $a$ and $b$, I attach to the index end of the counterpoise B a pointer, $i$, stepped or formed to correspond with the horizontal variations of the line of parallel graduations on the turned-up index scale-plate $a$ and $b$. (See Fig. 3.) This specially-formed pointer $i$ is so shaped that it indicates on both the scale-plates $a$ and $b$ at the same time.

For the purpose of switching the sliding counterpoise B from one notched bar, $a'$ or $b'$, on the face of the steelyard A to the other, the V projection $g$ is formed in duplicate on the pivoted tumbler $k$, the two knife-edged projections or V's $g$ being accurately pitched upon the periphery of the tumbler $k$ in such a manner that as the tumbler $k$ is revolved or rocked the knife-edged projections $g$ will take into their corresponding scale or series of graduations, which are notched upon the face of the steelyard or weigh-beam A. The tumbler $k$ is truly faced and turns upon a trunnion, $l$, which revolves within a truly-bored hole at the index end of the counterpoise B. To securely back the tumbler $k$ in any of the positions which it is required to take upon the series of notched graduations on the steelyard-bar A, I provide a steel bolt, $m$, with a round nose, which is operated by means of a coiled spring, $n$, which automatically causes the bolt $m$ to enter one of the two accurately-pitched recesses $p$, (see Fig. 4,) cut in the inner face of the tumbler $k$. The stepped pointer $i$ indicates on the turned-up indexing scale-plate the series of graduations as they are engaged by the V projections $g$ of the tumbler $k$.

In order to determine the aliquot parts of the main divisions of weight, which divisions are cut or notched on the notched bars $a'$ and $b'$ on the long arm of the steelyard A, I provide a truly-planed bar, $s$, which I secure to the side of the movable counterpoise B by means of the studs $s'$. (See Fig. 3.) Upon this bar $s$ there is a slide-weight, $t$, which slide-weight is provided with a stepped pointer or index, $u$, which can be set opposite to any division of a minor scale-plate, $v$ or $v'$, which is attached to the side of the movable counterpoise B in a position most convenient for reading, the scale-plates $v$ and $v'$ being the aliquot parts, respectively, of the scale-plates $a$ and $b$ on the steelyard. The stepped pointer $u$ is pitched to correspond with the parallel lines of graduation marked upon the minor scale-plates $v$ and $v'$, the upper divisions being the aliquot parts of the metric scale, the lower divisions being the aliquot parts of the avoirdupois scale.

The scale-plates $a$ and $b$ of the steelyard A and the minor scale-plates $v$ and $v'$ of the counterpoise B are respectively placed one under the other, and for improved legibility the respective scales are set in steps—namely, the zero-lines of the scales are not perpendicularly coincident, but are set one behind the other.

I have described a certain class of steelyard—namely, that which appertains to the weigh-bridge; but I would have it understood that my invention is equally applicable to steelyards of other description of weighing-machines; also, although I have particularly described my invention in connection with two standards of weight—namely, avoirdupois and metric—it will be understood that my invention is equally applicable to other different standards of weight or codes or values, and by multiplying the scales and the notched graduations more than two standards of weight can be displayed.

By my invention the index end of the sliding counterpoise B may be arranged to be capable of being switched from one fixed scale of divisions or notches on the steelyard to a second, third, or more fixed series of notches on the face of the steelyard, differing in pitch or value from one another.

Although I preferably employ a tumbler, as shown in the drawings, I do not confine myself to the tumbler, as the object of switching may be effected by levers, slides, or other means of engaging the notches with the movable weight or counterpoise B. For example, instead of arranging the V $g$ of the counterpoise B upon a tumbler, $k$, as shown at Fig. 4, it can be arranged according to the modification shown at Figs. 9, 10, and 11. In this case the knife-edges $g$ are in duplicate and are on the ends of the levers $k$ $k$, which correspond with the tumbler $k$ in Fig. 4. These levers $k$ $k$ rock on the fulcrum $l$, and are so arranged that they can be thrown back, as shown in dotted lines in Fig. 9. Thus either lever $k$ can be thrown back and its knife-edge $g$ disengaged, or it can be allowed through its knife-edge $g$ to engage with the notches of its scale on the face of the steelyard, set-screws $l'$ $l'$ being provided for holding the levers $k$ in position; or, instead of using the tumbler $k$, as shown at Fig. 4, or the lever modification, as shown at Figs. 9, 10, and 11, the V $g$ of the counterpoise B can be arranged upon a lifting-slide, $k$, as shown at Figs. 12, 13, and 14, or upon a simple slide, $k$, as shown at Fig. 15. In these cases the slide $k$ corresponds with the tumbler $k$ and has the same object—namely, to switch the V $g$ from the notches of one scale to the notches of the other scale on the face of the steelyard—the slide $k$ being mounted on the end of the counterpoise B and being held thereto and fixed in the requisite position thereon by the set-screws $l'$ $l'$, which pass through the guide-slot $l$ in the slide $k$ and screw into the end of the counterpoise B.

Instead of arranging the scale-plates $a$ and $b$ at an incline on the side of the steelyard-arm, as shown in the drawings, they may be arranged vertically; but I prefer to arrange them at an incline, as thereby the scales are more legible.

Having now described my invention, I claim—

1. The combination, with a steelyard, of a counterpoise, two or more engaging notched bars thereon, and a device upon the counterpoise having two or more projections alternately engaging with the notches on one or the other of said bars, whereby the sliding counterpoise may be switched from one scale to another or others, substantially as set forth.

2. The combination, with a steelyard, of a counterpoise, two or more notched bars thereon, a device upon the counterpoise having two or more shifting projections for engaging with the notches on one or the other of said bars, two or more corresponding scale-plates attached to said steelyard, and two or more pointing-fingers rigidly attached together, substantially as described.

3. The combination, with a steelyard, of a counterpoise, two or more notched bars, an engaging device with two or more shifting projections for engaging with the notches on one or other of said bars, and two or more corresponding scale-plates for the major units of weights, and two or more scale-plates and a sliding pointer for the minor units of weights, substantially as described.

4. The combination, with the steelyard A, of the scale-plates $a$ $b$, arranged with an upward inclination, the counterpoise B, the engaging device K, engaging-notches $a''$ $b''$, pointer $i$, scale-plates $v$, pointer $u$, weight $t$, and its guide-bar $s$, substantially as set forth with reference to the drawings.

5. The combination, with a steelyard and a counterpoise-weight, of a plurality of scale-plates bearing scale-divisions of different lengths, a plurality of notched bars, and a device having a plurality of projections alternately engaging with the notches on one or the other of said bars, substantially as described.

6. The combination, with a steelyard and a counterpoise-weight, of a plurality of scale-plates, a plurality of notched bars, a device having a plurality of projections alternately engaging with the notches on one or the other of said bars, and a sliding pointer having a plurality of pointing-fingers arranged one ahead of the other, substantially as described.

7. The combination of a steelyard and counterpoise-weight, a plurality of notched bars, a device having a plurality of projections alternately engaging with the notches on one or the other of said bars, a plurality of scale-plates bearing divisions corresponding to those on said notched bars, and a sliding pointer having fingers rigidly attached to each other and one set ahead of the other, substantially as described.

8. The combination of a steelyard and counterpoise-weight, scale-plates bearing scale-divisions of different lengths, a sliding pointer attached to said counterpoise having fingers set one ahead of the other and being rigidly attached to each other, scale-plates on said counterpoise bearing scale-divisions of different lengths, and a sliding pointer moving on said counterpoise having fingers set one ahead of the other and being rigidly attached to each other, substantially as described.

HENRY POOLEY.

Witnesses:
FREDERICK JOHN CHEESBROUGH,
JAMES ANDREW COUBROUGH,
*Both of 15 Water Street, Liverpool, England.*